(12) United States Patent
Harasawa

(10) Patent No.: US 6,185,022 B1
(45) Date of Patent: Feb. 6, 2001

(54) OPTICAL TRANSMISSION SYSTEM AND TRANSMITTING TERMINAL STATION

(75) Inventor: Shin-ichirou Harasawa, Kawasaki (JP)

(73) Assignee: Fujitsu Limited, Kawasaki (JP)

(*) Notice: Under 35 U.S.C. 154(b), the term of this patent shall be extended for 0 days.

(21) Appl. No.: 09/027,725

(22) Filed: Feb. 23, 1998

(30) Foreign Application Priority Data

| Aug. 1, 1997 | (JP) | ................................................ 9-207892 |
| Jan. 16, 1998 | (JP) | ................................................ 10-006257 |

(51) Int. Cl.⁷ ................................................ H04J 14/02
(52) U.S. Cl. ..................... 359/124; 359/110; 359/187; 359/161
(58) Field of Search ..................... 359/110, 124, 359/161, 173, 187

(56) References Cited

U.S. PATENT DOCUMENTS

| 5,387,992 | * | 2/1995 | Miyazaki et al. | ................. 359/124 |
| 5,790,289 | * | 8/1998 | Taga et al. | ........................... 359/124 |
| 5,801,860 | * | 9/1998 | Yoneyama | ............................ 359/124 |
| 5,894,362 | * | 4/1999 | Onaka et al. | ....................... 359/124 |

FOREIGN PATENT DOCUMENTS 8-321824   12/1996 (JP) .

* cited by examiner

Primary Examiner—Kinfe-Michael Negash
(74) Attorney, Agent, or Firm—Staas & Halsey LLP

(57) ABSTRACT

To improve the OSNR on a receiving side it is necessary to control pre-emphasis, and further to automatically control the pre-emphasis. Furthermore, when carrying out wavelength-division multiplexing, it is also necessary to control wavelength. The optical spectrum of signal lights is detected in both a transmitting terminal station and a receiving terminal station, a transmitting side spectrum detection result and a receiving side spectrum detection result are compared, and the levels and wavelengths of signal lights to be transmitted are controlled.

40 Claims, 16 Drawing Sheets

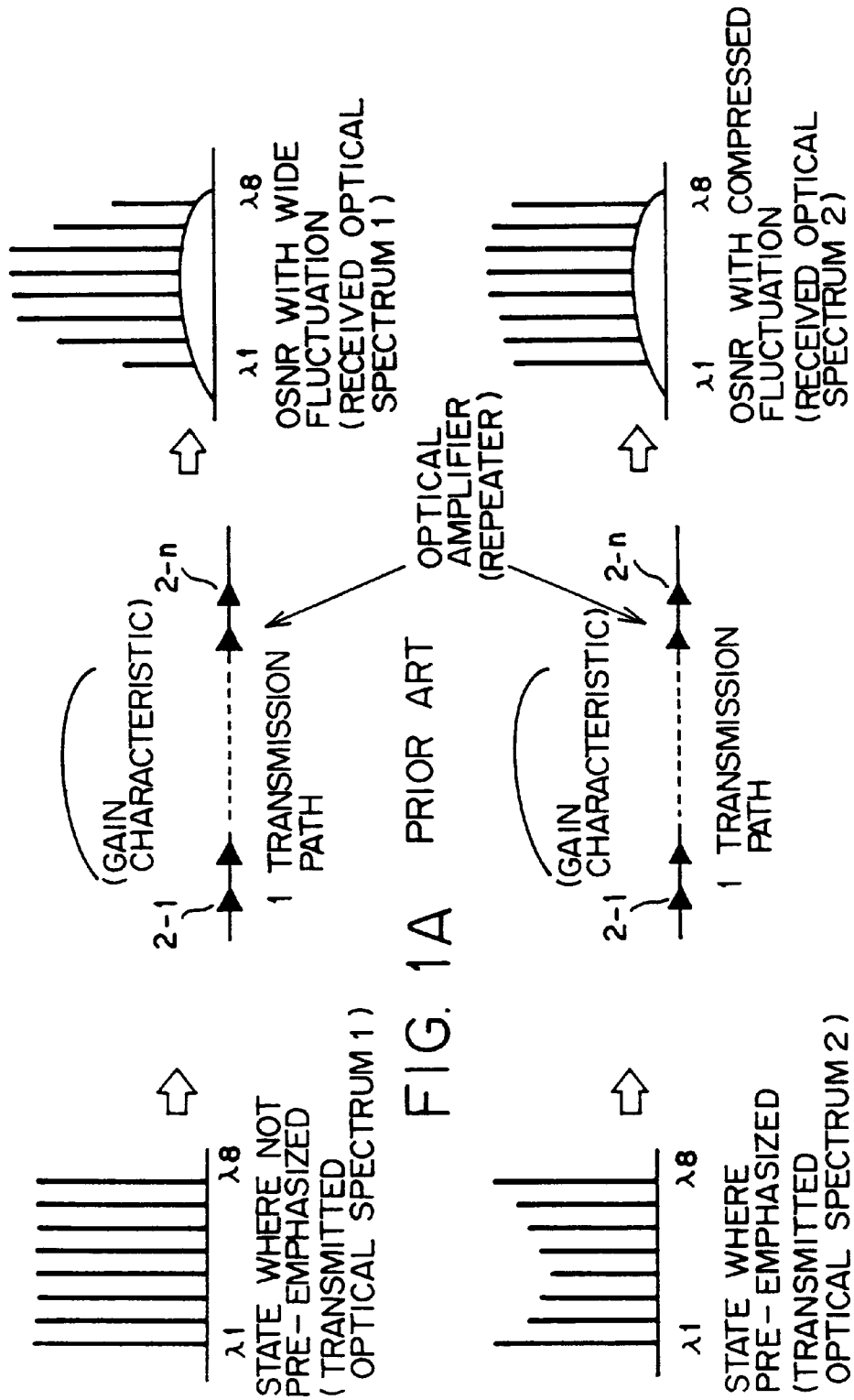

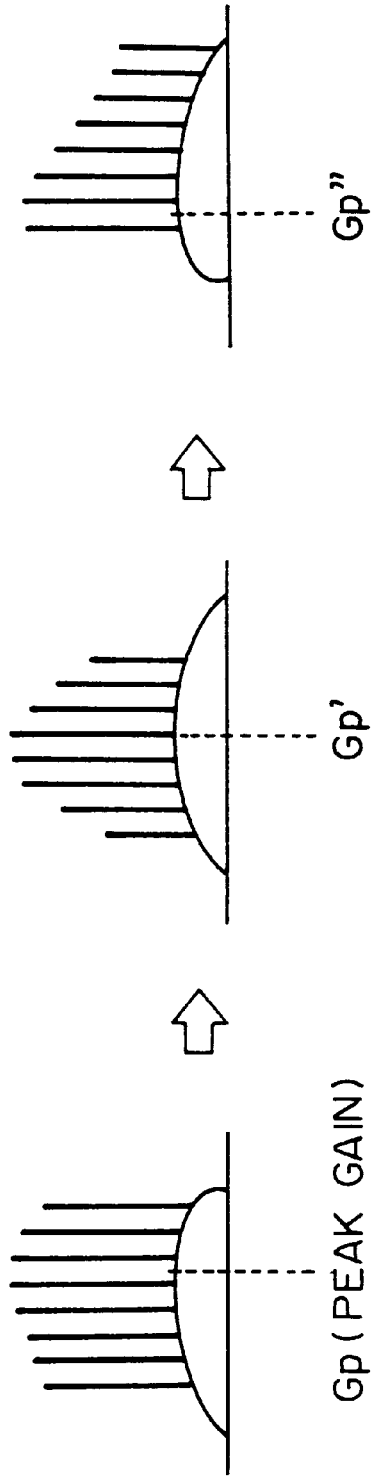
FIG. 2A PRIOR ART (TRANSMITTED OPTICAL SPECTRUM 1) DEFAULT (OSNR WITH NARROW FLUCTUATION) Gp (PEAK GAIN)
FIG. 2B PRIOR ART (TRANSMITTED OPTICAL SPECTRUM 2) Gp'
FIG. 2C PRIOR ART (TRANSMITTED OPTICAL SPECTRUM 3) AFTER THE LAPSE OF TIME (OSNR WITH WIDE FLUCTUATION) Gp"

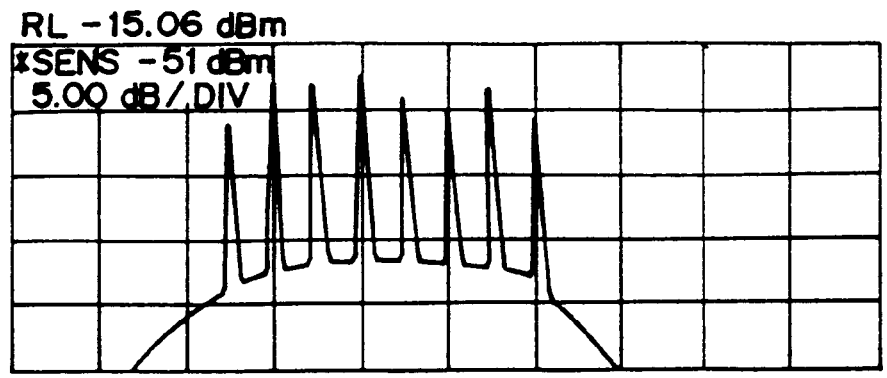
FIG. 3A  PRIOR ART
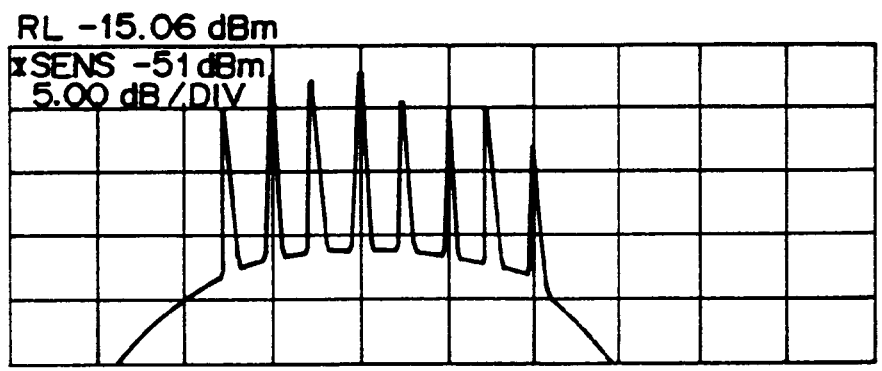
FIG. 3B  PRIOR ART
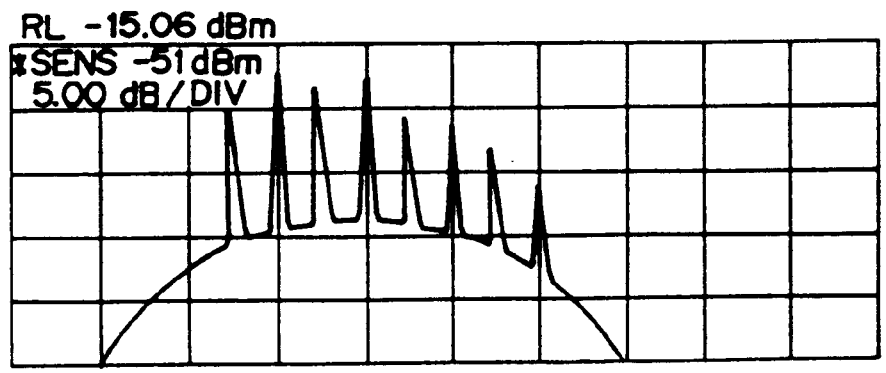
FIG. 3C  PRIOR ART

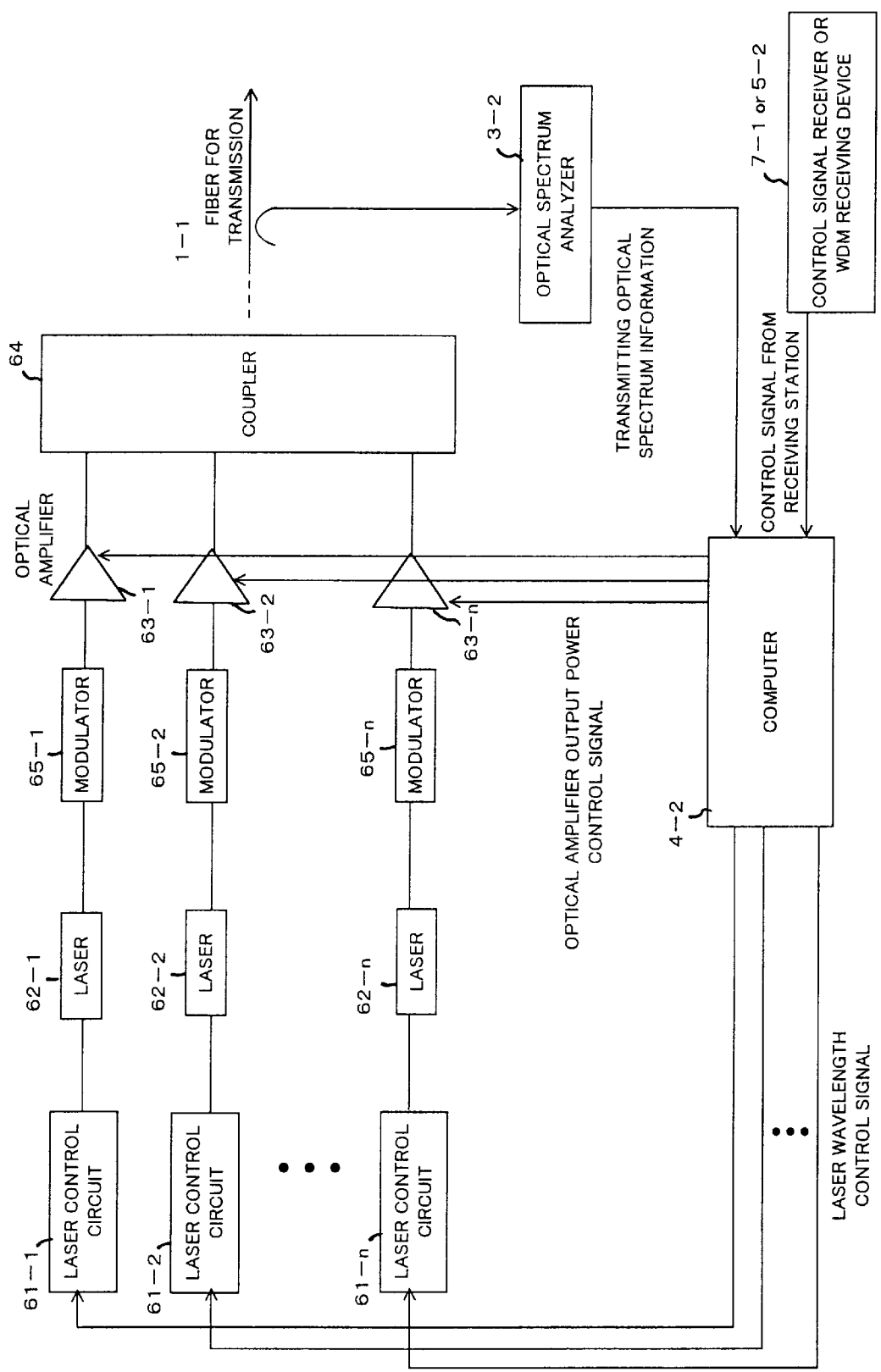
F I G. 8

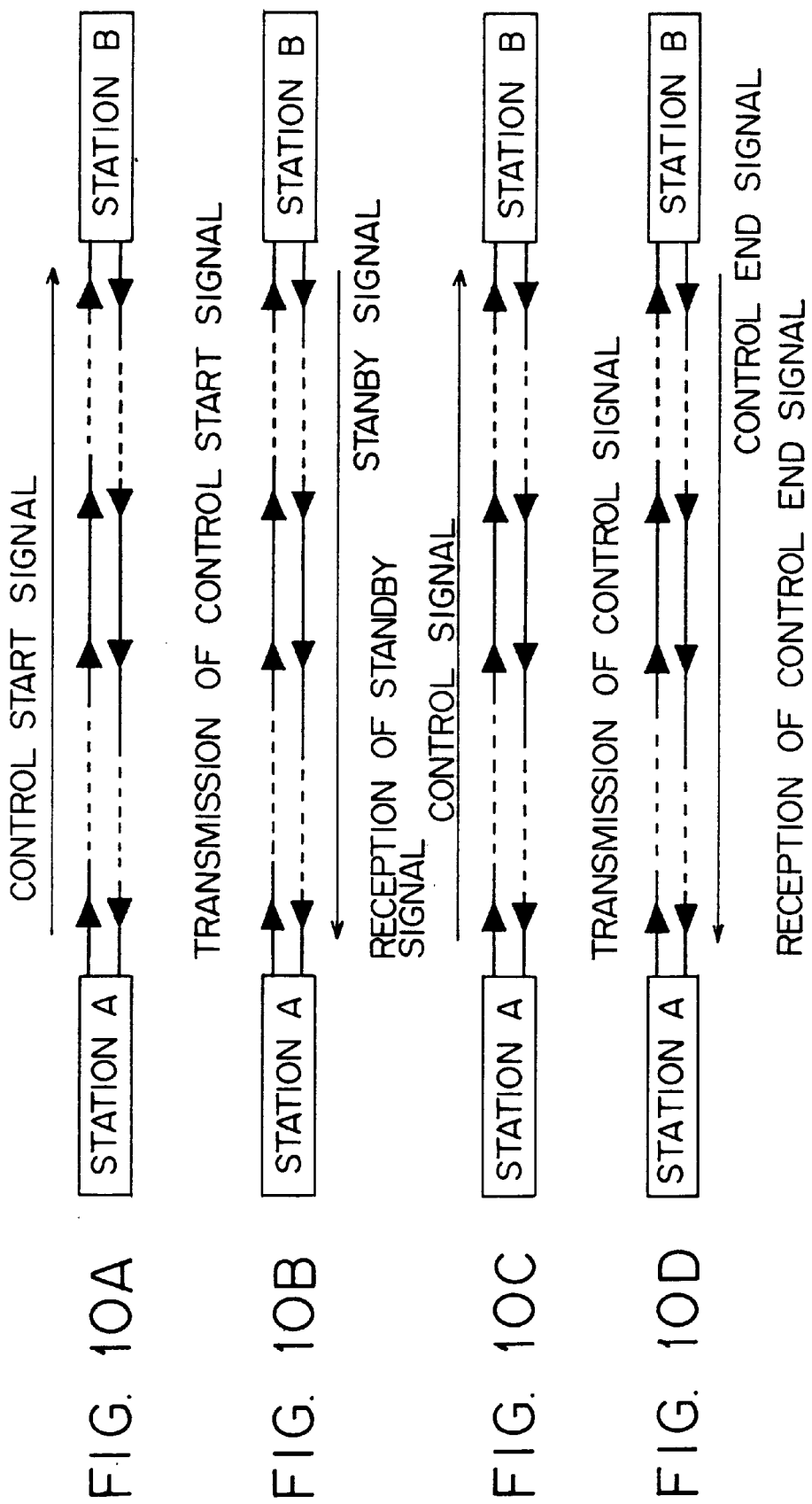

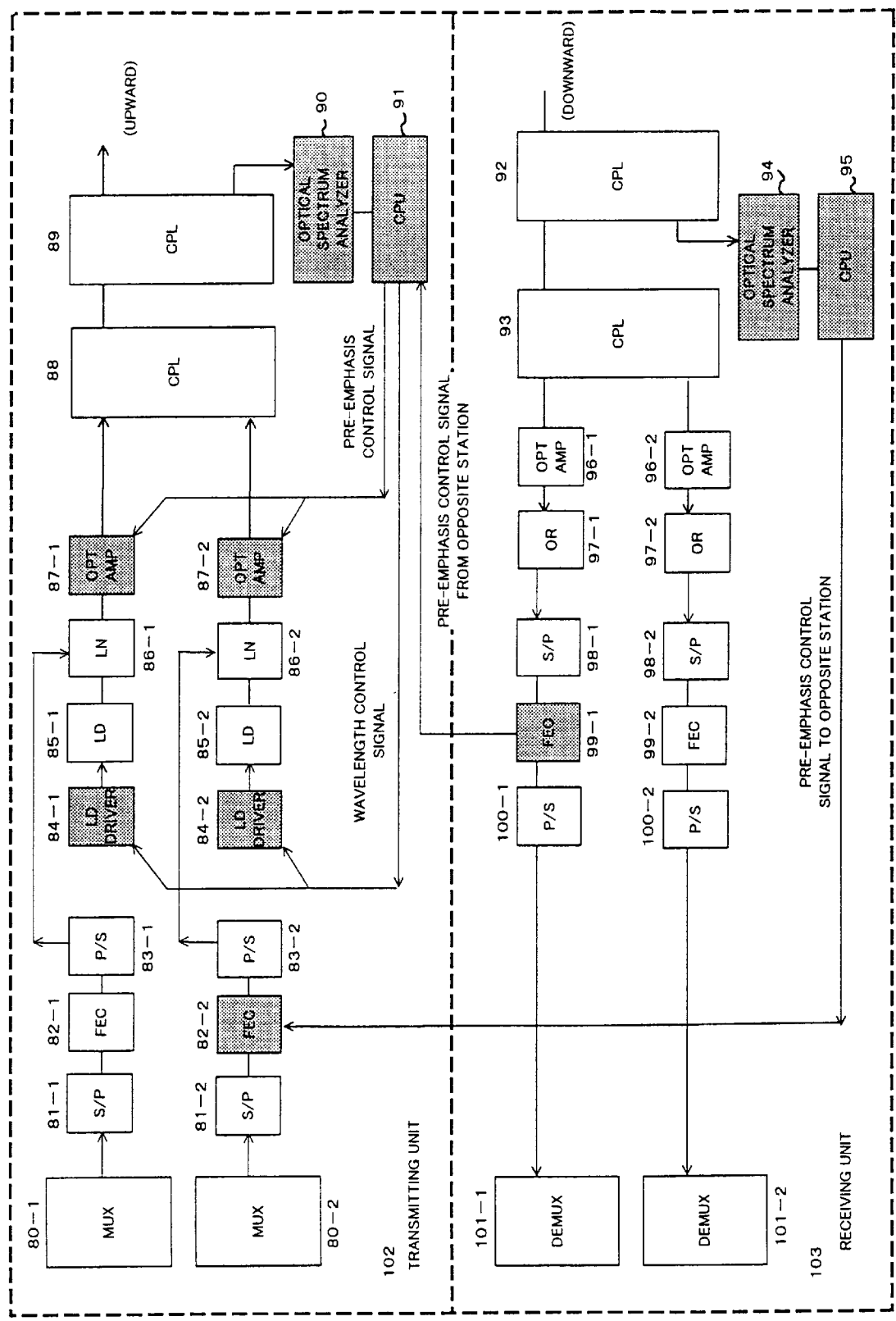
F I G. 12

OPTICAL TRANSMISSION SYSTEM AND TRANSMITTING TERMINAL STATION

BACKGROUND OF THE INVENTION

1. Field of the Invention

In optical wavelength-division multiplexing communication it is necessary to control both wavelength and level of each transmitted signal light in order to receive a transmitted optical signal in an optimal condition on the receiving side.

Furthermore, recently relay distances have been increased by installing repeaters with optical amplifiers in a transmission path between terminal stations.

The present invention relates to both wavelength control and level control of terminal equipment in a communication system configuration having a repeater with such an optical amplifier.

2. Description of the Related Art

FIGS. 1A and 1B show the pre-emphasis (explained below) in the case where wavelength-division multiplexing (WDM) transmission is made by connecting a plurality of optical amplifiers in series, and the optical signal-to-noise ratio (OSNR) after transmission.

In FIGS. 1A and 1B, $\lambda 1$ to $\lambda 8$ represent the wavelengths of the signal lights of an optical signal, and the heights of the wavelengths of the signal lights $\lambda 1$ to $\lambda 8$ represent the strength of each signal light.

In FIGS. 1A and 1B, an optical signal comprises a plurality of signal lights of different wavelengths, represented by $\lambda 1$ to $\lambda 8$.

In a transmission path 1 optical amplifiers 2-1 to 2-n used as repeaters are shown.

FIG. 1A shows the gain characteristic of the transmission path 1, in which the losses of optical amplifiers 2-1 to 2-n in the transmission path 1 and the transmission path itself are totaled, and the optical signal-to-noise ratio (OSNR) for each signal light, being a ratio in terms of the electric power of the signal light to that of the noise light.

When signal lights $\lambda 1$ to $\lambda 8$ with the same level are transmitted from the transmitting side, differences in levels occur between the signal lights due to the gain characteristic of the transmission path 1.

For this reason, as shown in FIG. 1B, to compensate for the gain characteristic of an optical repeater in the transmission path, the level of each signal light is changed on the transmitting side, by which the fluctuation in OSNR is suppressed when the signal lights are received.

This technology is called pre-emphasis, and is widely used.

The pre-emphasis shown in FIG. 1B is adjusted and fixed in the initial stages of the operation of a system.

However, the level of light input to the optical amplifiers 2-1 to 2-n fluctuates, and the gain of the entire transmission path 1 changes due to a fluctuation of the losses in the transmission path 1 during the operation of a system, caused by such as the insertion in the transmission path 1 of a new cable for the repair of a failed section, the insertion in the transmission path 1 of a repeater, the deterioration with the lapse of time of an optical fiber in the transmission path 1, etc., and the gain also changes due to the deterioration with the lapse of time of the optical amplifiers 2-1 to 2-n.

As a result, the gain characteristic of the entire transmission path changes, and the fluctuation of the OSNR cannot be compensated for by a fixed pre-emphasis method.

FIGS. 2A to 2C show the concept of a spectrum change of the signal lights with the lapse of time, and FIGS. 3A to 3C show the experiment results of the spectrum change of the signal lights with the lapse of time.

FIGS. 2A and 3A, FIGS. 2B and 3B, and FIGS. 2C and 3C show the original condition, after the lapse of a certain time, and after the lapse of a further certain time, respectively.

As shown in FIGS. 2A to 2C and FIGS. 3A to 3C, the fluctuation of the OSNR of each signal light increases as time elapses.

Particularly, this becomes a serious problem in the case of a submarine cable system used for long distance transmission.

As means to solve a problem like this, a technology with which the pre-emphasis can be changed on the transmitting side based on the spectrum of the receiving side, is shown in Laid-open Patent Publication No.8-321824.

More specifically, the spectrum of the wavelengths of each of the signal lights is measured in a receiving terminal station, the result of the measurement is overlaid on an optical signal or transmitted by being put in the vacant area of a header of the synchronous digital hierarchy (SDH), etc. to the transmitting terminal station using a downward line, and the amount of pre-emphasis is measured in the transmitting terminal station.

Although it is necessary to control the pre-emphasis in order to improve the OSNR on the receiving side, the gain fluctuation of the transmission path caused by the fluctuation of the losses due to the insertion in the transmission path of a new cable or the deterioration with the lapse of time, cannot be coped with by a fixed pre-emphasis method.

Although there is a technology to automatically control the pre-emphasis in the transmitting terminal station based on spectrum information sent from the receiving terminal, in order to cope with this situation, in this technology attention is paid only to the pre-emphasis control.

Although it is necessary to adjust the pre-emphasis in order to improve the OSNR of the wavelength-division multiplexed signal lights sent from the transmitting terminal station, both the wavelengths and output levels of the signal lights of the optical signal vary depending on both temperature and driving current value, since a signal light for each wavelength of the optical signal from the transmitting terminal station is output by a laser.

Particularly, when the high density of wavelength-division multiplexing is increased (the frequency of multiplexing), and it becomes necessary to strictly control the wavelength of each signal light, both wavelength fluctuation and level fluctuation occur if the pre-emphasis is controlled only based on information sent from the receiving terminal station.

SUMMARY OF THE INVENTION

It is an object of the present invention to provide a system for automatically controlling both the wavelength of each signal light and the power level of a signal light for each wavelength in a wavelength-division multiplexing system.

In the optical transmission system of the present invention, consisting of a transmitting terminal station for transmitting a plurality of signal lights to a transmission path, and a receiving terminal station for receiving the plurality of signal lights from the transmission path, the receiving terminal station is characterized by comprising a receiving side spectrum detecting unit for detecting the spectrum of signal lights and a unit for transmitting the detection result of the receiving spectrum detecting unit to the transmitting terminal station, whereas the transmitting terminal apparatus comprises a transmitting side spectrum detecting unit for detecting the spectrum of signal lights, a receiving side spectrum information detecting unit for detecting spectrum information sent from the receiving terminal station, and a pre-emphasis controlling unit for comparing spectrum information from the transmitting side spectrum detecting unit with spectrum information from the receiving side spectrum information detecting unit and controlling the levels and wavelengths of signal lights to be transmitted.

The transmitting terminal station of the present invention in an optical transmission system for transmitting pre-emphasis information from a receiving terminal station for receiving a plurality of wavelength-division multiplexed signal lights sent from a transmitting terminal station to the transmitting terminal station, comprises a transmitting side spectrum detecting unit for detecting the spectrum of transmitted signal lights, a receiving side spectrum information detecting unit for detecting spectrum information from the receiving terminal station, and a pre-emphasis controlling unit for comparing spectrum information from the transmitting side spectrum detecting unit with the spectrum information from the receiving side spectrum information detecting unit, and controlling the levels and wavelengths of signal lights to be transmitted.

Pre-emphasis can be controlled by comparing the spectrum measured in the transmitting terminal station with the spectrum measured in the receiving terminal station, and wavelengths can also be controlled based on the measured spectrum information.

In the wavelength-division multiplexing optical transmission system of another aspect of the present invention, where wavelength-division multiplexed optical signals are transmitted and received between a first terminal station and a second terminal station, the first terminal station is characterized in comprising a first optical spectrum analyzing unit for measuring the wavelength deviation of a signal light of each channel and the power level of a signal light for each wavelength of a wavelength-division multiplexed optical signal transmitted by the first terminal station, a wavelength adjusting unit for adjusting the wavelength of a signal light of a relevant channel if there is a deviation in wavelength, and a pre-emphasis unit for pre-emphasizing the power level of a signal light for each wavelength of a wavelength-division multiplexed optical signal transmitted by the first terminal station, when it is reported to the first terminal station from the second terminal station that the power level of a signal light for a wavelength of a wavelength-division multiplexed optical signal transmitted by the first terminal station is improper, whereas the second terminal station is characterized in comprising a second optical spectrum analyzing unit for measuring at least the power level of a signal light for each wavelength of a wavelength-division multiplexed optical signal transmitted by the first terminal station, and a transmitting unit for transmitting information on the power level of the signal light for each wavelength of a wavelength-division multiplexed optical signal transmitted by the first terminal station to the first terminal station.

In a wavelength-division multiplexing system for transmitting and receiving wavelength-division multiplexed optical signals between terminal stations, the terminal station is characterized in comprising a first optical spectrum analyzing unit for measuring the wavelength deviation of a signal light of each channel and the power level of a signal light for each wavelength of a wavelength-division multiplexed optical signal transmitted by the terminal station, a wavelength adjusting unit for adjusting the wavelength of a signal light of the relevant channel if there is a deviation in wavelength, and a pre-emphasis unit for pre-emphasizing the power level of a signal light for each wavelength of a wavelength-division multiplexed optical signal transmitted by the terminal station when it is reported to one terminal station from another terminal station that the power level of a signal light for a wavelength of a wavelength-division multiplexed optical signal transmitted by the terminal station is improper, a second optical spectrum analyzing unit for measuring at least the power level of a signal light for each wavelength of a wavelength-division multiplexed optical signal transmitted by the other terminal station, and a transmitting unit for transmitting information on the power level of a signal light for each wavelength of a wavelength-division multiplexed optical signal transmitted by the one terminal station to the other terminal station.

The control method of the present invention is a control method in a transmitting terminal station in an optical transmission system for transmitting pre-emphasis information from a receiving terminal station for receiving a plurality of wavelength-division multiplexed signal lights sent from the transmitting terminal station to the transmitting terminal station, and is characterized in comprising the step of detecting the spectrum of signal lights to be transmitted, the step of detecting spectrum information from the receiving terminal station, and the step of comparing the spectrum detection result of the transmitted signal lights with spectrum information from the receiving terminal station and controlling the level and wavelengths of signal lights to be transmitted.

The control method of another aspect of the present invention is a method of controlling the wavelength and power level of each signal light in a wavelength-division multiplexing system for transmitting and receiving wavelength-division multiplexed optical signals between terminal stations, and is characterized in comprising (a) the step of measuring the wavelength deviation of a signal light of each channel and the power level of a signal light for each wavelength of a wavelength-division multiplexed optical signal transmitted by its own terminal station, (b) the step of measuring at least the power level of a signal light for each wavelength of a wavelength-division multiplexed optical signal transmitted from another terminal station, (c) the step of adjusting the wavelength of a signal light of a channel if it is judged from the result of (a) that there is a deviation in wavelength, (d) the step of transmitting information on the power level of a signal light for each wavelength of a wavelength-division multiplexed optical signal transmitted from the other terminal station, and (e) the step of pre-emphasizing the power level of a signal light for each wavelength of wavelength-division multiplexed optical signal transmitted by its own terminal station, if it is reported to its own terminal station from another terminal station that the power level of a signal light for each wavelength of a wavelength-division multiplexed optical signal transmitted by its own terminal station is improper.

According to the present invention, the monitoring and controlling of both wavelength and power level of a signal light for each wavelength, which cannot be avoided in a wavelength-division multiplexing system, can be automatically made, which is very effective in the commercialization of a wavelength-division multiplexing optical communication system.

BRIEF DESCRIPTION OF THE DRAWINGS

FIGS. 1A and 1B show pre-emphasis and OSNR after transmission.

FIGS. 2A to 2C show the deterioration of the spectrum of signal lights with the lapse of time.

FIGS. 3A to 3C show the results of experiments.

FIG. 8 shows the configuration of a WDM signal transmitting device and peripheral devices.

FIGS. 10A to 10D show the control procedure in the case where pre-emphasis is controlled.

FIG. 12 shows the detailed configuration of a terminal station in the case where a method of writing a control signal, etc. in an overhead, is used.

DESCRIPTION OF THE PREFERRED EMBODIMENTS

The embodiments of the present invention are described below with reference to the attached drawings.

In FIG. 4, 1-1 and 1-2, 1-3, 3-1, 4-1, 5-1, and 6-2 represent optical fibers, a cable, an optical spectrum analyzer, a computer, a control signal transmitter, and a WDM signal transmitting device, respectively.

The fiber 1-1 transmits an optical signal comprising a plurality of signal lights from a transmitting terminal station to a receiving terminal station.

The optical spectrum analyzer 3-1 detects the received optical spectrum from the fiber 1-1.

The computer 4-1 calculates the optical spectrum value from the output of the optical spectrum analyzer 3-1, and transmits information based on the optical spectrum processing result to the transmitting terminal station, using the fiber 1-2.

This transmission can be implemented by writing the information in the overhead of a transmission signal, by amplitude-modulating a main signal with the information, by putting the information on a special wavelength used for control signal transmission, etc.

6-2 represents a WDM signal transmitting device for transmitting a transmission optical signal from the receiving terminal station to the transmitting terminal station.

Figure 5:
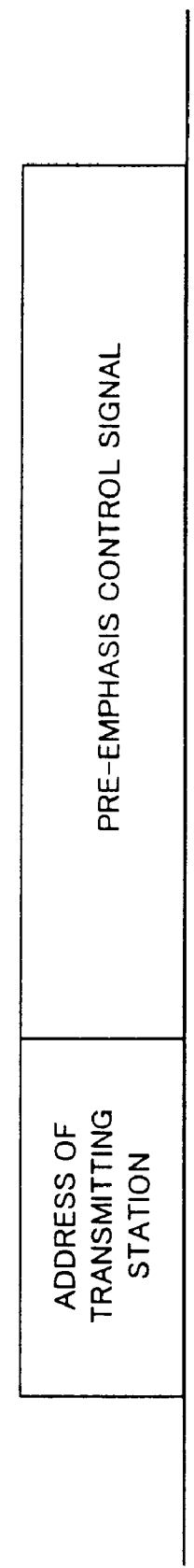
FIG. 5 shows the structure of a control signal sent from a receiving terminal station to a transmitting terminal station.

FIG. 5 shows the structure of a control signal sent from a receiving terminal station to a transmitting terminal station.

The control signal is composed of address information corresponding to the transmitting terminal station name transmitting the control signal, and the control signal information.

It is because the control signal can be used in a complex network where many stations are inserted between a transmitting terminal station and a receiving terminal station that address information is attached.

Figure 6:
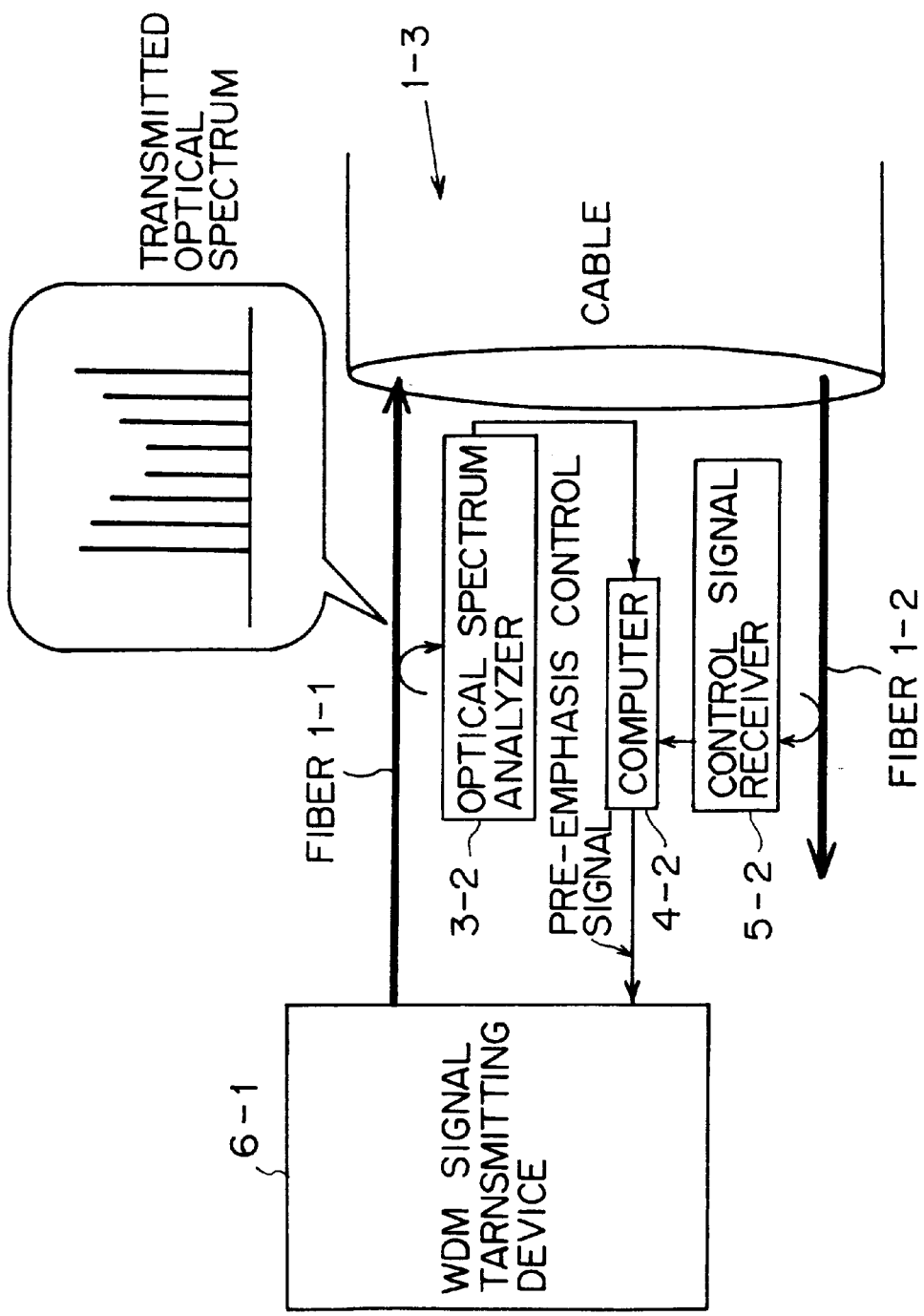
FIG. 6 shows a first example of the detailed configuration of a transmitting terminal station.
Figure 7:
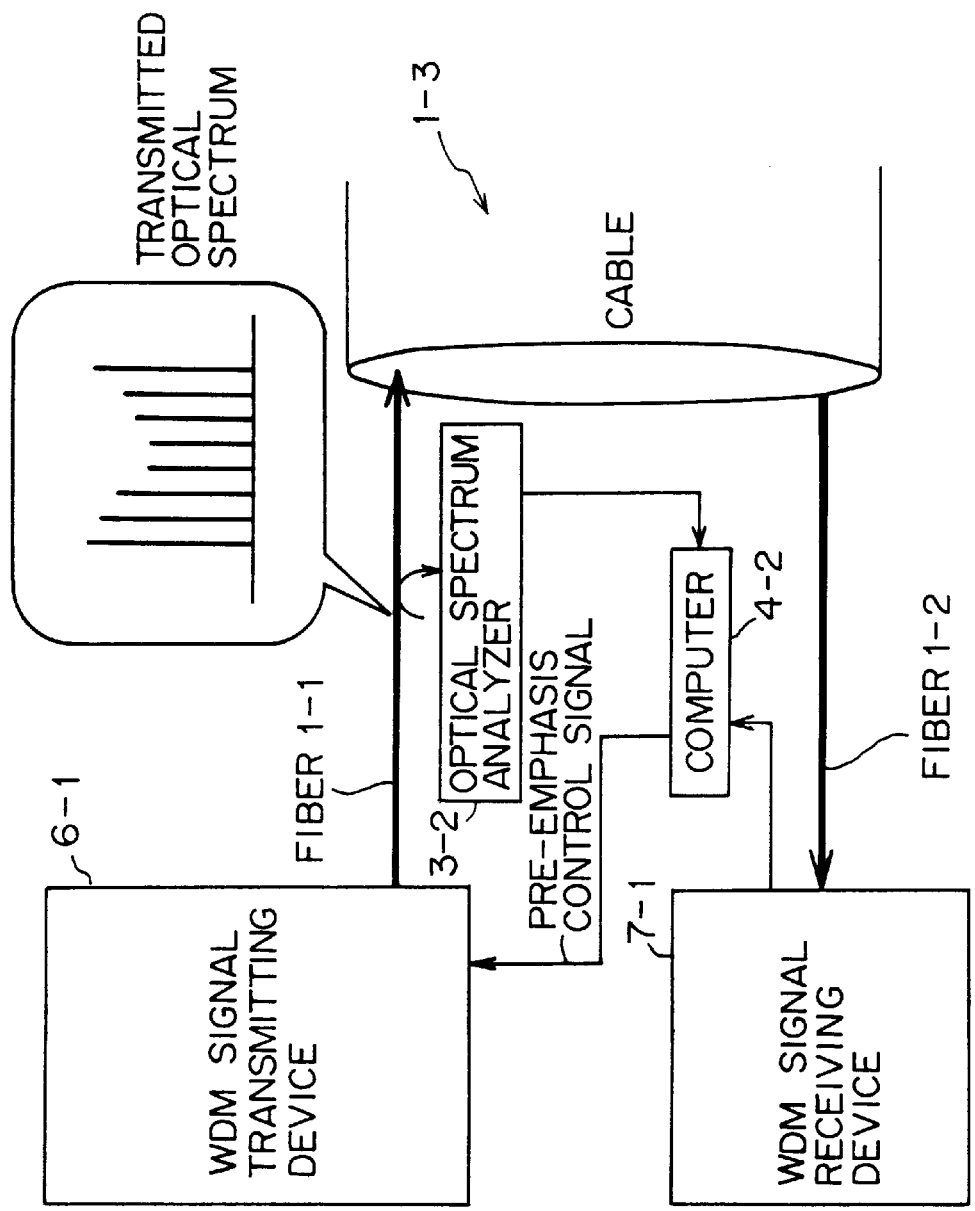
FIG. 7 shows a second example of the detailed configuration of a transmitting terminal station.

FIGS. 6 and 7 show examples of the detailed configuration of a transmitting terminal station.

Figure 4:
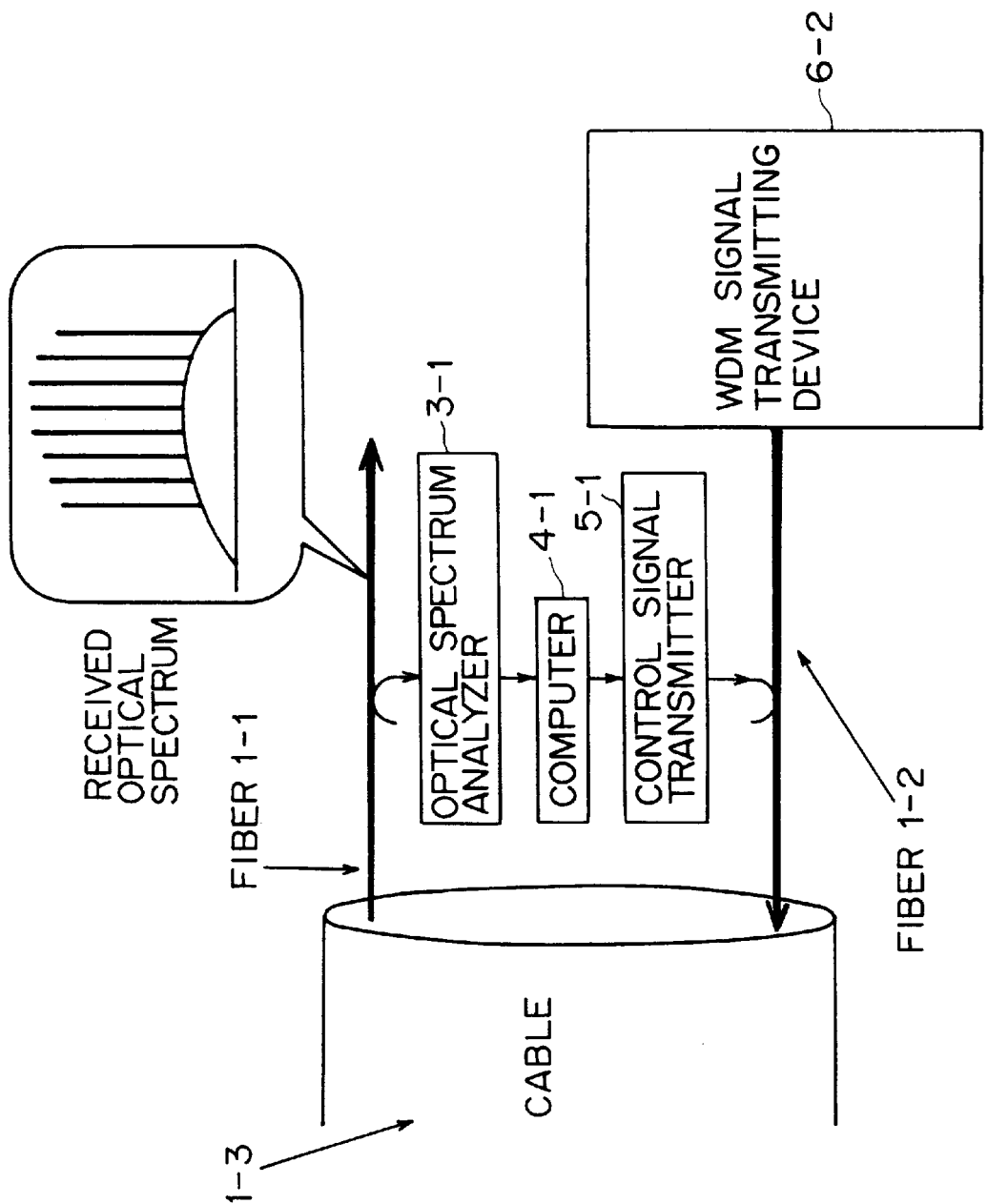
FIG. 4 shows the configuration of a receiving terminal station.

In FIGS. 6 and 7, the same components as in FIG. 4 are shown by the same reference number, and in addition to these, 6-1, 3-2, 4-2, 5-2 and 7-1 represent a WDM signal transmitting device, an optical spectrum analyzer, a computer, a control signal receiver and a WDM signal receiving device, respectively.

In FIG. 6, a control signal sent along the fiber 1-2 is received by the control signal receiver 5-2, and the spectrum of the signal lights input to the fiber 1-1 is detected by the optical spectrum analyzer 3-2.

The computer 4-2 compares the optical spectrum information of the signal lights on the receiving terminal station side received by the control signal receiver 5-2, with the optical information of the signal lights on the transmitting terminal station side detected by the optical spectrum analyzer 3-2, judges whether or not the readjustment of pre-emphasis is required according to established criteria, inputs both wavelength control signals and control signals for controlling the levels of the signal lights to be transmitted for pre-emphasis to the WDM signal transmitting device 6-1, and thereby controls both the wavelength and level of each signal light output to the fiber 1-1 by the WDM signal transmitting device 6-1.

FIG. 7 shows the configuration in the case where the control signal is received by the WDM signal receiving device 7-1 for receiving transmission signals sent from the WDM signal transmitting device on the receiving terminal station side, instead of the control signal receiver 5-2 shown in FIG. 6.

The configuration shown in FIG. 7 is very effective in extracting the control signal when the control signal is written in the overhead part of a frame of a transmission signal transmitted by the WDM signal transmitting device 6-2 shown in FIG. 4.

FIG. 8 shows the configuration of a WDM signal transmitting device and peripheral devices shown in FIGS. 6 and 7.

In the drawing 61-1 to 61-$n$, 62-1 to 62-$n$, 63-1 to 63-$n$, 65-1 to 65-$n$, and 64 represent laser control circuits, lasers, optical amplifiers, modulators, and a coupler, respectively.

In FIG. 8, the same components as in FIGS. 6 and 7 are represented by the same reference numbers.

The light emissions of the lasers 62-1 to 62-$n$ are controlled by the laser control circuits 61-1 to 61-$n$.

The outputs of the lasers 62-1 to 62-$n$ are modulated to the signals to be transmitted, by the modulators 65-1 to 65-$n$, and the signals are input to the optical amplifiers 63-1 to 63-$n$.

The modulated signals are amplified to predetermined levels by the optical amplifiers 63-1 to 63-$n$, are wavelength-division multiplexed by the optical coupler 64, and output to the fiber 1-1.

The computer 4-2 extracts a control command from the control signal in the main signal, the control signal from the fiber 1-2 is received by the control signal receiver 5-2, and the spectrum of signal lights input to the fiber 1-1 is detected by the optical spectrum analyzer 3-2.

The computer 4-2 compares the optical spectrum information of the signal lights on the receiving terminal station side received by the control signal receiver 5-2, with the optical spectrum information on the transmitting terminal station side detected by the optical spectrum analyzer 3-2, and judges according to established criteria whether or not a readjustment of pre-emphasis is required.

Furthermore, the computer 4-2 outputs a signal for controlling the gain of the optical amplifiers 63-1 to 63-*n* in order to control pre-emphasis based on the judgement result, individually adjusts the gain of each optical amplifier, and corrects the fluctuation of the OSNR characteristic of the signal light for each wavelength of an optical signal on the receiving terminal station side.

If these optical amplifiers 63-1 to 63-*n* are optical fiber amplifiers in which an optical fiber is doped with a rare-earth element, the computer 4-2 can control the output of a pump light source for controlling the optical fiber amplifiers. If the optical amplifiers 63-1 to 63-*n* are semiconductor optical amplifiers, the computer 4-2 can control the gain of the optical amplifiers 63-1 to 63-*n* by controlling the bias currents of the semiconductor devices.

If the outputs of the lasers 62-1 to 62-*n* are high enough, the levels can also be adjusted by providing variable optical attenuators instead of optical amplifiers, and attenuating the output lights of the lasers 62-1 to 62-*n*.

The outputs of the optical amplifiers 63-1 to 63-*n* are coupled by the coupler 64, and are output to the fiber for transmission as the signal light to be transmitted.

Furthermore, the computer 4-2 outputs laser wavelength control signals for controlling either or both of the temperature and driving current to the laser control circuits 61-1 to 61-*n* so that the interval between the wavelength of the lasers 62-1 to 62-*n* is controlled to be a predetermined value.

Using these laser wavelength control signals, the laser circuits 61-1 to 61-*n* control either or both of the temperature and driving current of the lasers 62-1 to 62-*n*, so that each wavelength is shifted to a predetermined wavelength.

At this time, by controlling either or both of the temperature and driving current of the lasers 62-1 to 62-*n*, the output levels of the lasers 62-1 to 62-*n* change, and the value of pre-emphasis also fluctuates.

Figure 9:
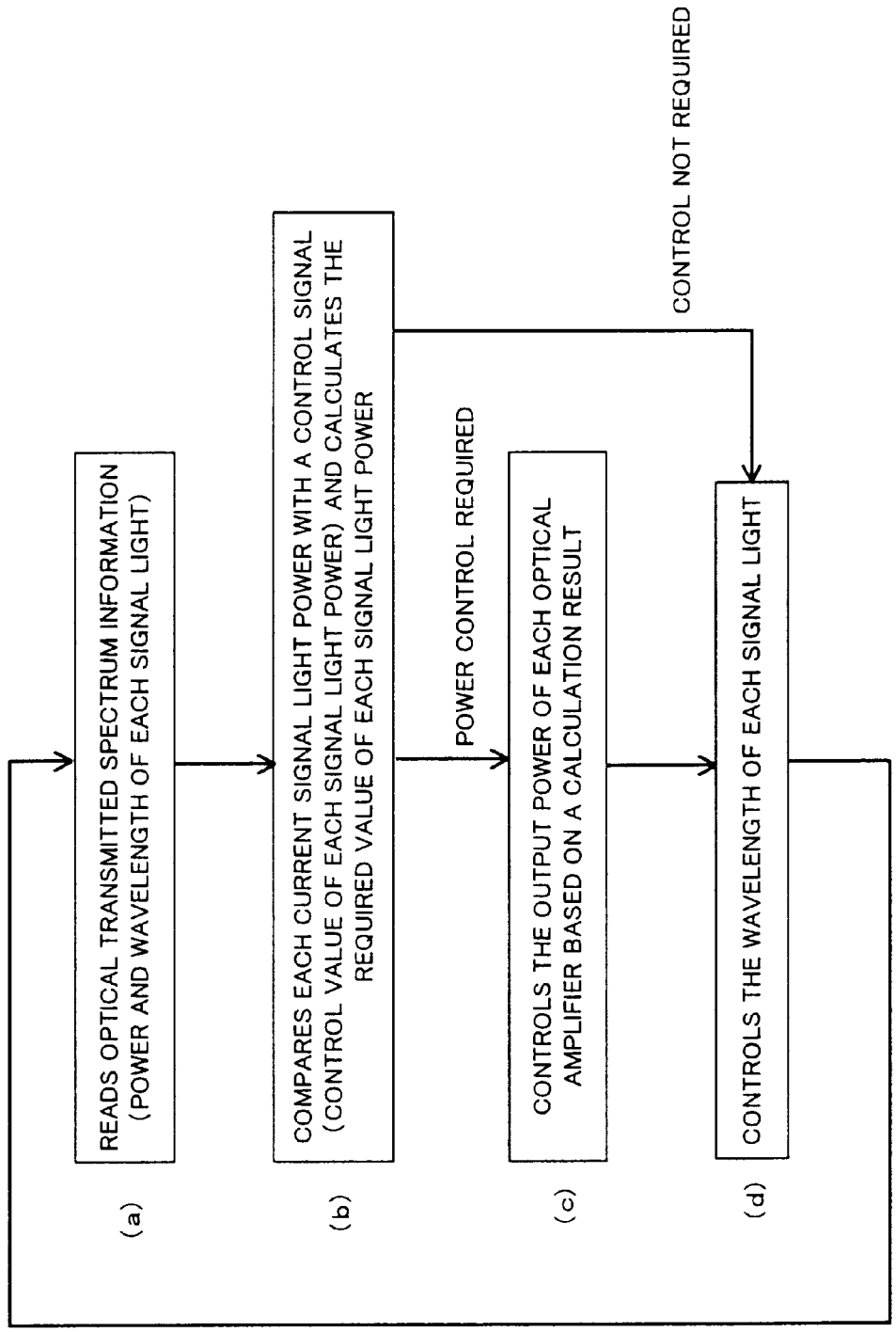
FIG. 9 shows the operational flow of pre-emphasis and signal wavelength control.

For this reason, the computer 4-2 is designed to repeat the control of (a) to (d) until each wavelength becomes a predetermined value, with the OSNR fluctuation on the receiving side within a predetermined range, by controlling the pre-emphasis and signal wavelengths as shown in the flow shown in FIG. 9.

If a failure occurs in a system consisting of the optical spectrum analyzer 3-1, computer 4-1 and control signal transmitter 5-1 as shown in FIG. 4, the pre-emphasis can also be controlled only by the i-control of both optical spectrum analyzer 3-2 and computer 4-2 shown in FIGS. 6 and 7, and the pre-emphasis can also be controlled if a failure occurs in the pre-emphasis control system on the receiving terminal station side.

Furthermore, if a failure occurs on the transmitting terminal station side, pre-emphasis control is available by controlling under the control of the computer 4-2 both pre-emphasis and wavelength based on information from the optical spectrum analyzer on the transmitting terminal station side, without waiting for a control signal sent from the receiving terminal station side, since the computer 4-2 copes with the change to the pre-emphasis caused by repairing or replacing a failed part.

FIGS. 10A to 10D show the control procedure in the case where pre-emphasis is controlled for the total transmission system.

In FIGS. 10A to 10D, station A and station B are a receiving terminal station and a transmitting terminal station, respectively.

Firstly, as shown in FIG. 10A, a control start signal for requesting to start pre-emphasis control, is transmitted from station A to station B.

Then, as shown in FIG. 10B, station B, which has received the control start signal, transmits a standby signal for reporting that station B is ready to start the pre-emphasis control, to station A.

Next, as shown in FIG. 10C, station A, which has received the standby signal, detects the spectrum of the signal lights received via the transmission path and transmits the control signal to station B.

Lastly, as shown in FIG. 10D, station B controls both pre-emphasis and wavelength based on the control signal from station A, and transmits a control end signal to station A after confirming that both the interval between each wavelength of the transmitted optical spectrum and the pre-emphasis controlled output become pre-determined values.

Figure 11A:
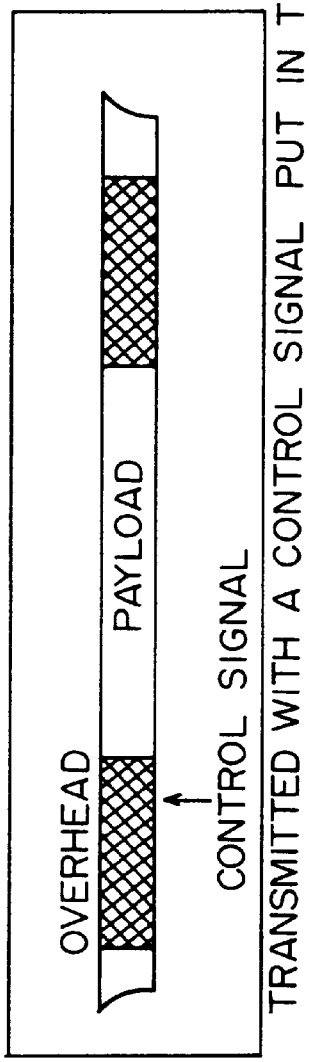
FIGS. 11A to 11C show transmitting methods of control start signal, standby signal, control signal and control end signal.
Figure 11B:
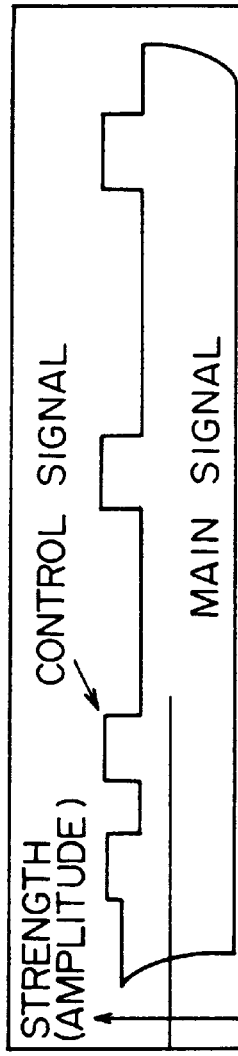
Figure 11C:
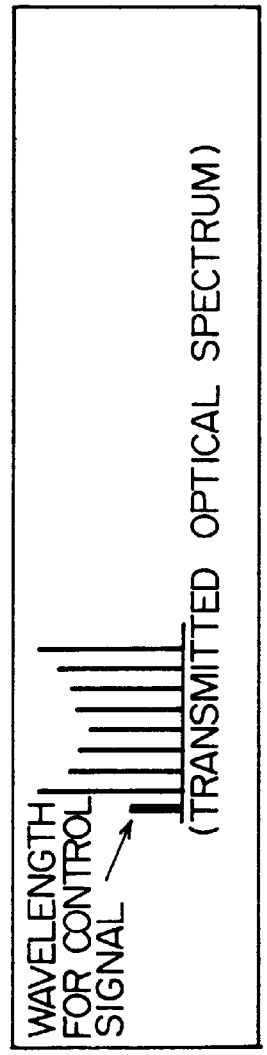

FIGS. 11A to 11C show transmitting methods of the control start signal, standby signal, control signal and control end signal shown in FIGS. 10A to 10D.

FIG. 11A shows a method of writing the signals in the overhead of a transmission signal. Data to be transferred consist of an overhead for storing control signals, etc. and a payload for storing data to be transmitted. The above-mentioned signals are written in the overhead.

FIG. 11B shows a method of amplitude-modulating a main optical signal with a signal. That is, the state where the strength of the main optical signal is modulated by a control signal, is shown.

FIG. 11C shows a method of putting information on a special control signal wavelength and transmitting the information by wavelength-division multiplexing. That is, the state where, in addition to the 8 wavelengths of the signal lights being the main optical signal, a control signal with a lower power level is multiplexed using a wavelength different from those of the main optical signal, is shown.

The control between a transmitting terminal station and a receiving terminal station is available by transmitting various kinds of control signals using the methods shown in FIGS. 11A to 11C.

FIG. 12 shows the detailed configuration of a terminal station in the case where a method of writing a control signal, etc. in an overhead is used.

Although in FIG. 12, to simplify the drawing, only the case where the number of wavelength-division multiplexing channels is 2, a system for a greater number of multiplexing channels is also available, if only the configuration from the multiplexers 80-1 and 80-2 of a transmitting unit 102 up to a coupler 88, or the configuration from a coupler 93 up to the demultiplexers 101-1 and 101-2 of a receiving unit 103, is modified in accordance with the required number of wavelength-division multiplexing channels.

The terminal station shown in FIG. 12 comprises a transmitting unit 102 for transmitting optical signals and a receiving unit 103 for receiving the signals. The signal processing units on the latter stages of both multiplexers 80-1 and 80-2 and demultiplexers 101-1 and 101-2 of the transmitting unit 102 and the receiving unit 103, respectively, are omitted in the drawing.

An electric signal transmitted from the signal processing unit, not shown in the drawing, is input to the transmitting unit 102, is multiplexed by the multiplexer 80-1 or 80-2 for each channel, and is output. The multiplexed electric signal is converted from a serial signal to a parallel signal by a serial/parallel converter (S/P) units 81-1 or 81-2. Then, this parallel signal is input to a forward error correction (FEC) unit 82-1 or 82-2. In the FEC unit 82-1 or 82-2 a redundant code for correction in the case where an error occurs, is attached to the signal. Then, the parallel signal including the redundant code is input to a parallel/serial converter (P/S) unit 83-1 or 83-2, whereby it is restored to a serial signal. Then, the thus-generated serial signal is input to an external modulator (LN) 86-1 or 86-2 for generating an optical signal as a modulated signal.

LD drivers 84-1 and 84-2 respectively, drive LDs 85-1 and 85-2 for producing laser lights with respective wavelengths, whereby lights with stable wavelengths are output. The light with the respective wavelength output from the LD 85-1 or 85-2 is modulated by the external modulator 86-1 or 86-2, and is output as a modulated signal light. This signal light is amplified by an optical amplifier 87-1 or 87-2, and is input to the coupler 88. The coupler 88 is, for example, a WDM coupler. By this coupler 88 the signal light for each wavelength is wavelength-division multiplexed into a wavelength-division multiplexed optical signal. This wavelength-division multiplexed optical signal is input to a coupler 89 for branching the signal, for example, in the ratio 4:1, and a part of the branched signal is input to an optical spectrum analyzer 90. The part of the optical signal not branched is output to a transmission path as it is.

In the optical spectrum analyzer 90 it is detected whether or not each signal light is output with a specified wavelength. This information is input to a CPU 91. When the wavelength of a signal light of a certain channel has deviated from a specified value, and the CPU detects that the wavelength is out of tolerance, a wavelength control signal for correcting the wavelength deviation is input to the LD driver (84-1 or 84-2) of the channel in which there is deviation in wavelength. The tolerance is ±0.2 nm, for example, when the interval between wavelengths is 1 nm. By controlling the temperature of the LD 85-1 or 85-2 the LD driver changes the oscillation wavelength so that the wavelength of laser light may become a specified value.

When the receiving unit 103 of the terminal station shown in the drawing receives optical signals from the transmission path, the optical signal is branched by a coupler 92, and the branched signal is input to an optical spectrum analyzer 94. In the optical spectrum analyzer 94 it is checked whether or not the power levels of the signal lights for each wavelength are uniform or whether or not the OSNR of the signal lights for each wavelength are uniform, and the result is input to a CPU 95. The CPU 95 analyzes the measurement result of the optical spectrum analyzer 94, and if the CPU 95 judges that there is a fluctuation in power levels or OSNRs among the signal lights for each wavelength, the CPU 95 transmits a pre-emphasis control command to the FEC 82-2 (or 82-1) of the transmitting unit 102 in order to convey the information to the relevant station which has transmitted the optical signal. This pre-emphasis control command is inserted in the overhead of the signal by the FEC 82-2, and is transmitted to the relevant station from the transmitting unit 102. (Although in the case of the drawing it is shown that the pre-emphasis control command is input to the FEC 82-2, the command can also be input to the FEC 82-1. Since a channel for transmitting a pre-emphasis control signal is normally fixed, the FEC of this corresponding channel is connected with the CPU 95.)

On the other hand, the part of the optical signal not branched by the coupler 92 is input to a coupler 93, and is demultiplexed into signal lights for each wavelength. This coupler 93 is, for example, a WDM coupler. When for a coupler 93 a WDM coupler is not used, and only a coupler for branching an optical signal like the coupler 92, is used, filters for extracting signal lights for each wavelength are required in the output stage of the coupler 92. The optical signal is demultiplexed into signal lights for each wavelength by the coupler 93, each of which is input to an optical amplifier 96-1 or 96-2, and is a-amplified. Then, the signal is received by an optical receiver 97-1 or 97-2, and is converted to an electric signal. The converted electric signal is converted to a parallel signal by a serial/parallel converter unit 98-1 or 98-2, and is input to an FEC 99-1 or 99-2. In the FEC 99-1 or 99-2 the redundant code is processed. If a pre-emphasis control signal is inserted in the overhead of the signal transmitted from the relevant station, the pre-emphasis control signal is extracted, and is sent to the CPU 91. (Although in the case of the drawing it is shown that the pre-emphasis control command is extracted only by the FEC 99-1, the command can also be extracted by the FEC 99-2. Provided that the system is so configured that an FEC corresponding to a channel to which the pre-emphasis control command may be transmitted is connected with the CPU 91, the channel to which the pre-emphasis control command is transmitted is usually fixed.) The signal processed by the FEC 99-1 or 99-2 is converted to a serial signal by a parallel/serial converter unit 100-1 or 100-2, and is sent to a demultiplexer 101-1 or 101-2. In the demultiplexer 101-1 or 101-2 the serial signal is demultiplexed, necessary data are extracted, and the data are processed by the signal processing unit, not shown in the drawing.

The pre-emphasis control command extracted by the it FEC 99-1 is transmitted to measure the power level and OSNR of the signal lights for each wavelength of the optical signal transmitted to the station from the relevant station, and when there is a deviation, to correct the power level and OSNR. Therefore, the CPU 91 which has received the pre-emphasis control command from the FEC 99-1, outputs a pre-emphasis control signal according to the command, controls the gain of an optical amplifier 87-1 or 87-2, and adjusts the output level so that the power level or OSNR of a signal light for each wavelength received in the relevant station may become proper. Control by a pre-emphasis control command is repeated until the power level or OSNR of a signal light for each wavelength received on the receiving terminal station side becomes proper.

Although in the drawing the adjustment of the output level of a signal light for each wavelength has been explained by adjusting the gain of the amplifier 87-1 or 87-2, the method of adjusting the output level is not limited to this. For example, the system can be so configured as to adjust the relative output levels of the signal lights for each wavelength by providing a variable optical attenuator in the position of the optical amplifier 87-1 or 87-2 in the drawing, and adjusting the attenuation of the attenuator, and to collectively amplify the wavelength-division multiplexed optical signal by providing an optical amplifier between the coupler 88 and the coupler 89.

Although in the drawing two optical spectrum analyzers and CPUs are provided, one of each can be so configured as to be commonly used by both the transmitting unit 102 and the receiving unit 103. In this case, it is acceptable if the input to the optical spectrum analyzer is configured to be switched over by means of an optical switch, etc., and the one CPU is configured to carry out the processes of both CPUs 91 and 95 shown in the drawing.

Figure 13:
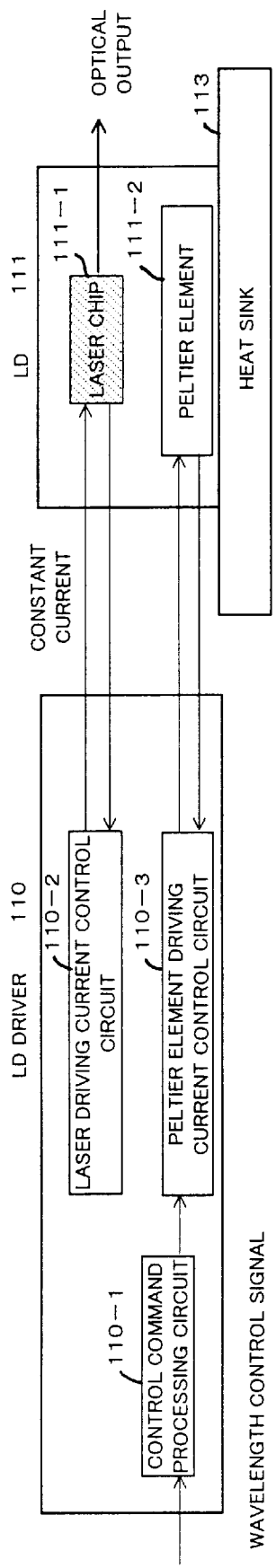
FIG. 13 shows the detailed configuration of a laser diode (LD) driver and an LD.

FIG. 13 shows the detailed configuration of a laser diode (LD) driver and an LD.

In the drawing, an example of the configuration to control the wavelength to be output by controlling the temperature of the laser when the laser driving current is constant, is shown. Of course, the wavelength to be output can also be controlled by keeping the temperature of the laser constant and changing the laser driving current.

The LD driver 110 comprises a control command processing circuit 110-1 for converting a received wavelength control signal to an LD temperature control signal, a laser driving current control circuit 110-2 for supplying the laser with a constant driving current, and a Peltier element driving current control circuit 110-3.

The LD111 comprises a heat sink 113 for dissipating the generated heat, a laser chip 111-1 being the laser itself, and a Peltier element 111-2 for controlling the temperature of the laser chip 111-1.

The laser driving current control circuit 110-2 supplies the laser chip 111-1 with a constant current, thereby causing the laser chip 111-1 to output laser light. The Peltier element 111-2 is so configured that the element may be in close contact with the laser chip 111-1, whereby the temperature of the Peltier element may be directly conveyed to the laser chip 111-1, and the temperature of the laser chip 111-1 may become the same as the temperature of the Peltier element 111-2. The Peltier element 111-2 is thermally controlled by a current generated based on a signal applied to the Peltier element driving current control circuit 110-3 by the control command processing circuit 110-1 which has received a wavelength control signal. The Peltier element driving current control circuit 110-3 can increase or decrease the temperature of the Peltier element 111-2 by changing the polarity of the current. Since generally the laser chip 111-1 has a small heat capacity, the temperature of the laser chip 111-1 is easily changed according to the temperature of the Peltier element 111-2. The heat sink 113 dissipates heat so that the temperature in the LD111 may not be higher than required. By configuring the apparatus in this way the wavelength of the laser light from the laser chip 111-1 can be controlled to be relatively stable.

Figure 14:
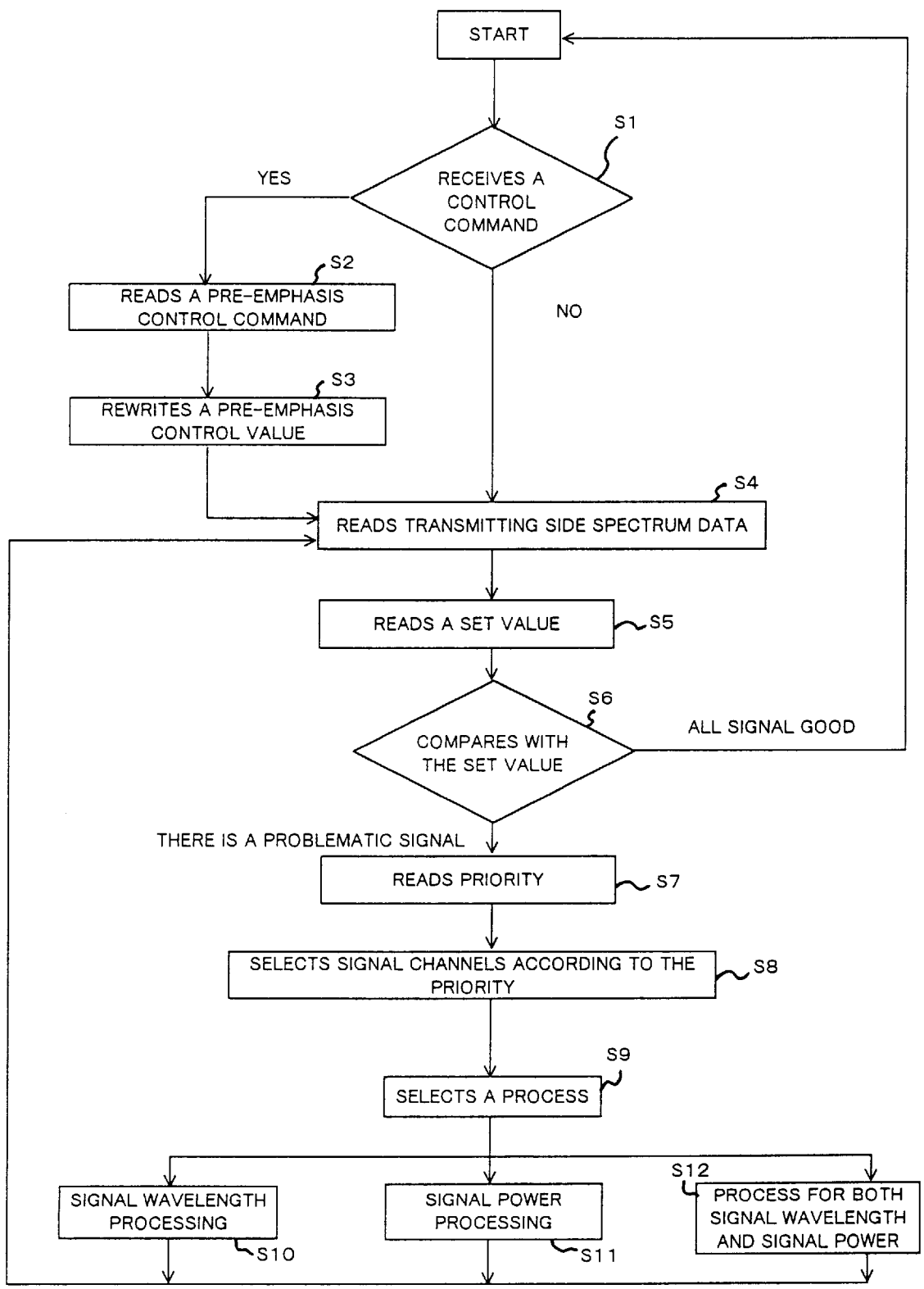
FIG. 14 is a flowchart showing the process executed by a CPU on the transmitting side shown in FIG. 12.

FIG. 14 is a flowchart showing the process executed by a CPU on the transmitting side in FIG. 12.

First, in step Si it is judged whether or not there is a control command from the relevant station. That is, it is judged whether or not a pre-emphasis control command has been transmitted from the relevant station. If the control command has not been received, the flow proceeds to step S4. If the control command has been received, in step S2 the pre-emphasis control command is read, and in step S3 the pre-emphasis control value is rewritten. A pre-emphasis value indicates how high the output level of a signal light should be for each wavelength. For example, a CPU-q readable RAM, etc. is prepared, in which the values are recorded as a table. In step S4 the spectrum data of signal lights sent from the transmitting unit side are read from the spectrum analyzer. In step S5 both the set value of the wavelength to be possessed by a signal light for each channel and the above-mentioned pre-emphasis control value are read. In step S6 the spectrum data read in step S4 and the set value read in step S5 are compared, and problematic signal lights are selected. If there is no problem in any of the signal lights, the flow returns to the start, and the process is repeated. If it is judged in step S6 that there are problematic signal lights, in step S7, a predetermined priority according to which signal light should be processed first is read when there are a plurality of problematic signal lights. A CPU-readable ROM or RAM is prepared, and this priority is also recorded in a form of table. In step S8, out of a plurality of problematic signal lights, only one is selected according to the priority. Then, in step S9 the contents of the adjustment are selected for the one selected signal light. This selection is made based on the comparison with the set value in step S6. If there is only a shift of wavelength, a signal light wavelength process is executed in step S10. If there is a pre-emphasis control command and it is judged that pre-emphasizing only is improperly carried out, a signal light power processing is executed in step 811. If it is judged in step S6 that there are both wavelength shift and improper pre-emphasis, in step S12 both signal light wavelength processing and signal power processing are executed.

When the one of the processes of steps S10, 11 and 12 is terminated, the flow returns to step S4, the transmitting side spectrum data are read again, and a problematic channel is searched. If there is a problematic channel, the channel is suitably processed. In this way, this process is repeated. If it is judged in step S6 that there is no problematic signal light among all of the channels, the flow returns to the start, and the complete process is repeated.

Figure 15:
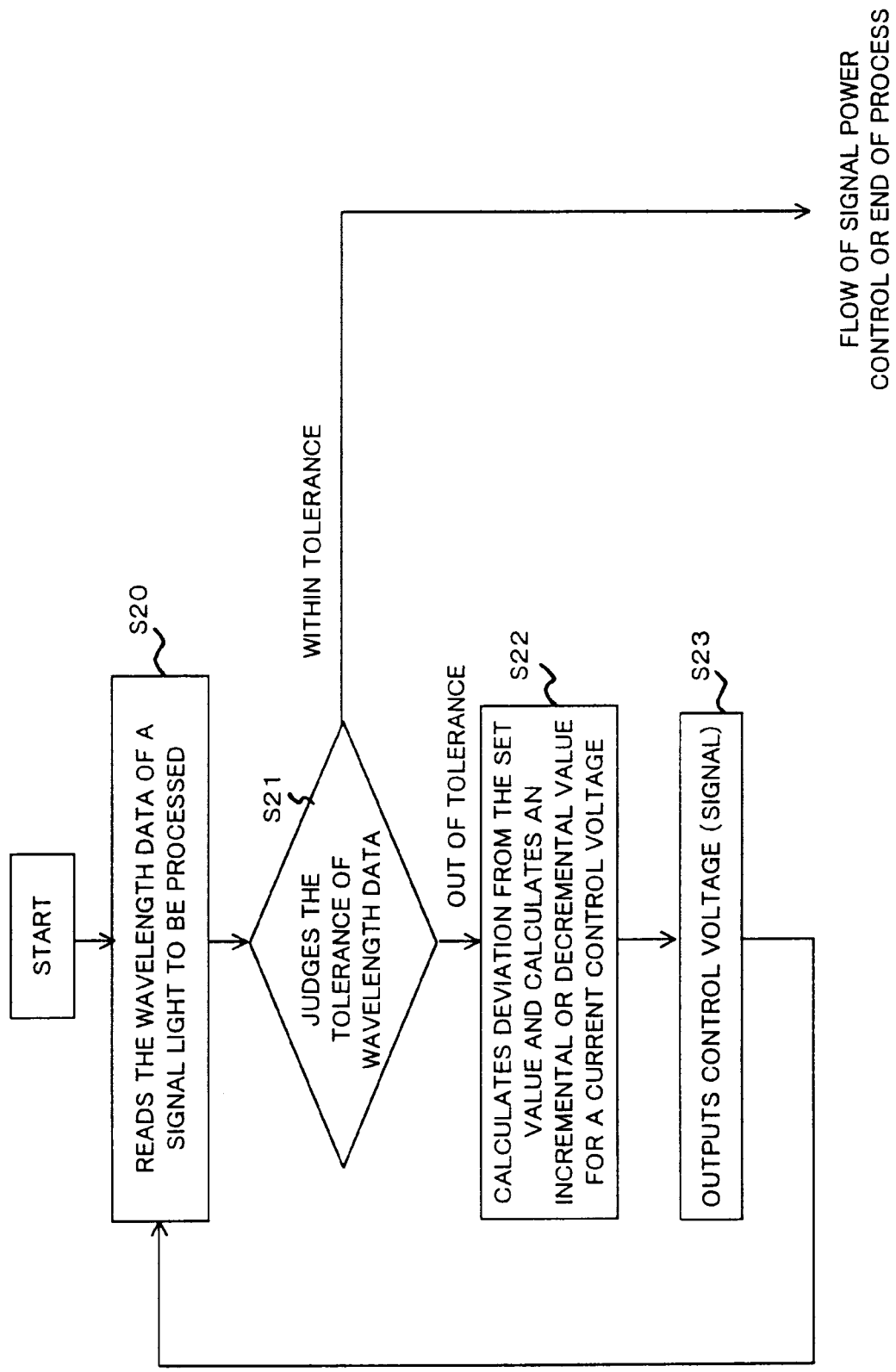
FIG. 15 is a flowchart showing the signal light wavelength processing shown in FIG. 14.

FIG. 15 is a flowchart showing the signal light wavelength processing shown in FIG. 14.

First, in step S20 the wavelength data to be processed are read from the optical spectrum analyzer. In step S21 it is judged whether or not the wavelength data are within a predetermined tolerance. For an example of the tolerance, the amount of wavelength shift shall be within ±0.2 nm when a wavelength interval is 1 nm. When it is judged in step S21 that the amount of wavelength shift is within the tolerance, a signal light power processing is executed (in the case of step S12 in FIG. 14), or the process is terminated (in the case of step S10 in FIG. 14).

In step S21 the deviation from the set value read previously is calculated, and an incremental or decremental value for the current control voltage applied to the LD driver is calculated. For example, the control of the LD driver is made by an increase or decrease of the control voltage. The relation between the control voltage and wave length is made to be a linear relation ($Y = A \times X + B$; Y: wavelength and X: control voltage), and coefficients A and B are recorded in advance in a CPU-readable memory such as a RAM, etc. as default values. Then, in step S23 a control voltage (signal) is output, and the flow returns to step S20. Then, the above-mentioned process is repeated until the wavelength data become within the tolerance as judged in step S21.

Figure 16:
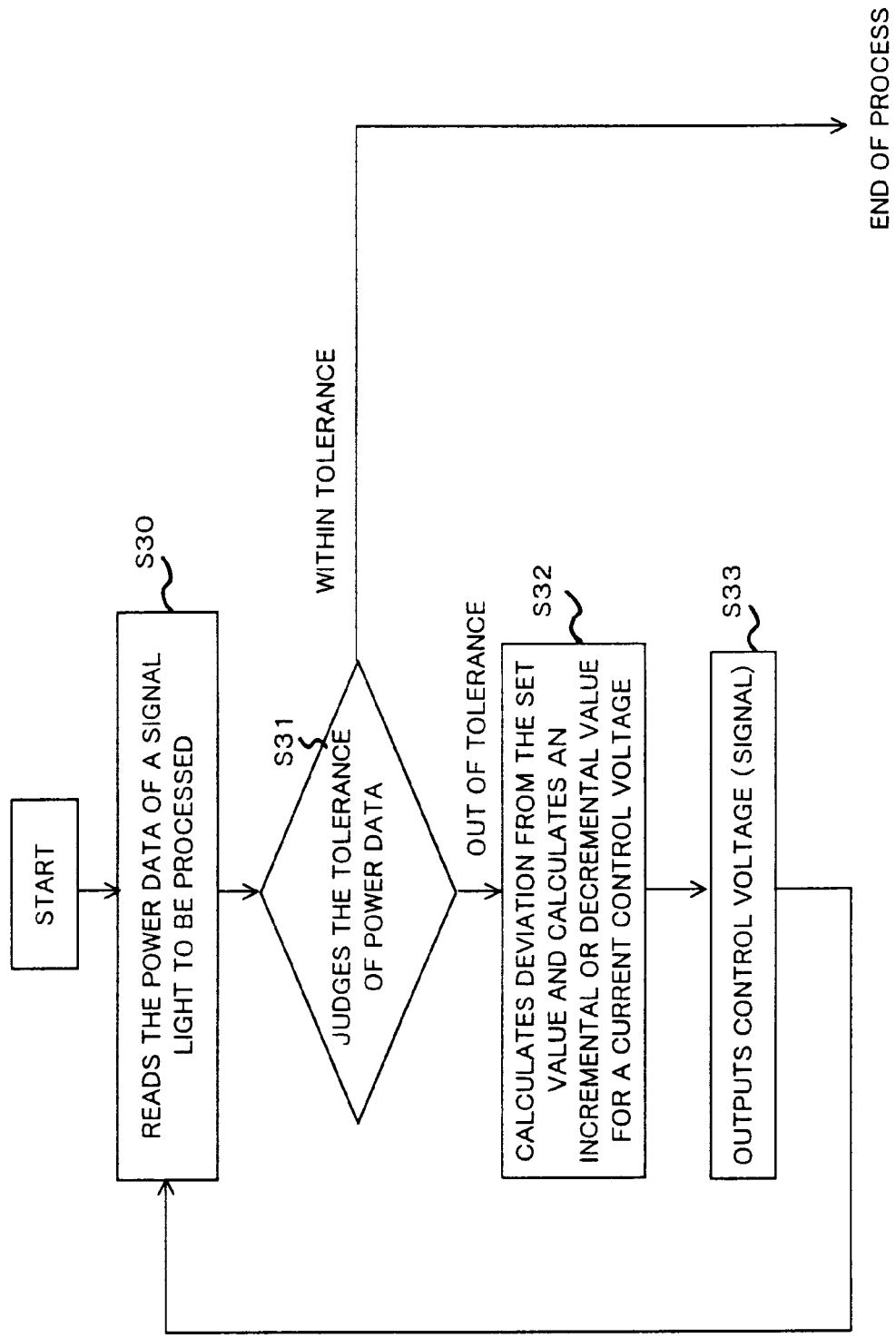
FIG. 16 is a flowchart showing the signal light power processing shown in FIG. 14.

FIG. 16 is a flowchart showing the signal light power processing shown in FIG. 14.

First, in step S30 the power data to be processed are read from the optical spectrum analyzer. In step S31 it is judged whether or not the power data match with the tolerance value indicated by the pre-emphasis control value which has been rewritten according to the pre-emphasis control command sent from the relevant station. If the data are within the tolerance, the process is terminated. If it is judged that the data are out of the tolerance, in step S32 the deviation from the set value read previously is calculated, and the incremental or decremental value of the current control voltage is calculated. Control to be applied to an optical amplifier or optical attenuator in order to control the power of a signal light, is made by an increase or decrease of the control voltage. The relation between the control voltage and the optical power is made to be a linear relation ($Y = A \times X + B$; Y:optical power and X: control voltage), and coefficients A and B are recorded in advance in a CPU-readable memory such as a RAM, etc. as default values in the same way as described before. Then, in step S33 the control voltage (signal) is output, the flow returns to step S30, and the process is repeated until the power data of the signal light are within the tolerance. When the power data are within the tolerance, step S31 terminates the process.

In the present invention, by comparing the spectrum measured in a transmitting terminal station with the spectrum measured in a receiving terminal station, and controlling the pre-emphasis, the wavelength can be controlled based on measured spectrum information, and the level of each wavelength of the optical spectrum can also be corrected by the wavelength control.

Since the optical spectrum is measured in both the transmitting terminal station and the receiving terminal station in order to control pre-emphasis, the pre-emphasis can be continuously controlled even if a failure occurs in either of the systems.

What is claimed is:

1. An optical transmission system comprising:
   a transmitting terminal station transmitting a wavelength division multiplexed (WDM) signal light to a transmission path, the WDM signal light including a plurality of signal lights at different wavelengths multiplexed together; and
   a receiving terminal station receiving the WDM signal light from the transmission path, the receiving terminal station including
      a receiving side spectrum detecting device detecting a spectrum of the received WDM signal light, and
      a transmission device transmitting spectrum information of the detected spectrum to the transmitting terminal station,
   wherein the transmitting terminal station includes
      a transmitting side spectrum detecting device detecting a spectrum of the WDM signal light before the WDM signal light is received by the receiving terminal station,
      a receiving side spectrum information detecting device detecting the spectrum information transmitted from the transmission device of the receiving terminal station, and
      a pre-emphasis controlling device comparing spectrum information of the spectrum detected by the transmitting side spectrum detecting device with the spectrum information detected by the receiving side spectrum information detecting device, and controlling a level and wavelength of each signal light before being multiplexed in accordance with the comparison.

2. The optical transmission system according to claim 1, wherein, for a respective signal light, the pre-emphasis controlling device alternately and repeatedly controls the level and wavelength of the signal light.

3. The optical transmission system according to claim 1, where if a failure occurs in the receiving side spectrum detecting device, and in the transmission device, the level and wavelength of signal lights can be controlled by the transmitting side spectrum detecting device and the pre-emphasis controlling device.

4. A transmitting terminal station in an optical transmission system for transmitting pre-emphasis information from a receiving terminal station for receiving a plurality of wavelength-division multiplexed signal lights from a transmitting station to the transmitting terminal station, comprising:
   transmitting side spectrum detecting means for detecting the spectrum of signal lights to be transmitted;
   receiving side spectrum information detecting means for detecting spectrum information from the receiving terminal station; and
   pre-emphasis controlling means for comparing spectrum information from the transmitting side detecting means with the spectrum information from the receiving side spectrum information detecting means, and controlling the level and wavelength of signal lights to be transmitted.

5. The transmitting terminal station according to claim 4, wherein
   the level of a signal light to be transmitted and the wavelength of a signal light to be transmitted are controlled alternately and repeatedly.

6. The transmitting terminal station according to claim 4, wherein
   the level and wavelength of signal lights to be transmitted can be controlled by the transmitting side spectrum detecting means and the pre-emphasis controlling means in the transmitting terminal station.

7. A wavelength-division multiplexing optical transmission system for transmitting and receiving wavelength-division multiplexed optical signals between a first terminal station and a second terminal station, wherein
   the first terminal station comprises
   first optical spectrum analyzing means for measuring the wavelength deviation of a signal light of each channel and the power level of a signal light for each wavelength of a wavelength-division multiplexed optical signal transmitted by the first terminal station;
   wavelength adjusting means for adjusting the wavelength of a signal light of a channel when there is a wavelength deviation in the channel; and
   pre-emphasis means for pre-emphasizing the power level of a signal light for each wavelength of a wavelength-division multiplexed optical signal transmitted from the first terminal station when it has been reported to the first terminal station from the second terminal station that the power level of a signal light for a wavelength of a wavelength-division multiplexed optical signal transmitted by the first terminal station is improper, and
   the second terminal station comprises
   second optical spectrum analyzing means for measuring at least the power level of a signal light for each wavelength of a wavelength-division multiplexed optical signal transmitted by the first terminal station; and
   transmitting means for transmitting information on the power level of a signal light for each wavelength of a wavelength-division multiplexed optical signal transmitted by the first terminal station to the first terminal station.

8. The optical transmission system according to claim 7, wherein
   said wavelength controlling means controls the wavelength of the signal light in which there is the wavelength deviation, by controlling the temperature of the light source of the signal light based on the value measured by said first optical spectrum analyzing means.

9. The optical transmission system according to claim 7, wherein
   said wavelength controlling means controls the wavelength of the signal light in which there is the wavelength deviation, by controlling the driving current applied to the light source of the signal light based on the value measured by said first optical spectrum analyzing means.

10. The optical transmission system according to claim 7, wherein
said pre-emphasizing means pre-emphasizes by controlling the gain of an optical amplifier provided to amplify a signal light for each wavelength.

11. The optical transmission system according to claim 7, wherein
said pre-emphasizing means pre-emphasizes by adjusting the attenuation of a variable optical attenuator for adjusting the output level of a signal light for each wavelength.

12. The optical transmission system according to claim 7, wherein
said transmitting means stores information on the power level of a signal light for each wavelength of a wavelength-division multiplexed optical signal transmitted from the first terminal station in the overhead of the optical signal, and transmits the signal to the first terminal station.

13. The optical transmission system according to claim 7, wherein
said transmitting means overlays information on the power level of a signal light for each wavelength of a wavelength-division multiplexed optical signal transmitted from the first terminal station, on an optical signal, and transmits the signal to the first terminal station.

14. The optical transmission system according to claim 7, wherein
said transmitting means multiplexes information on the power level of a signal light for each wavelength of a wavelength-division multiplexed optical signal transmitted from the first terminal station, to a main optical signal as an optical signal with a wavelength different from the main optical signal, and transmits the signal to the first terminal station.

15. A terminal station in a wavelength-division multiplexing system for transmitting and receiving wavelength-division multiplexed optical signals between terminal stations, comprising:
first optical spectrum analyzing means for measuring the wavelength deviation of a signal light of each channel and the power level of a signal light for each wavelength of a wavelength-division multiplexed optical signal transmitted by the terminal station;
wavelength adjusting means for adjusting the wavelength of a signal light of a channel when there is a deviation in wavelength of the channel;
pre-emphasis means for pre-emphasizing the power level of a signal light for each wavelength of a wavelength-division multiplexed optical signal transmitted from the first terminal station when it has been reported to the terminal station from a second terminal station that the power level of a signal light for a wavelength of a wavelength-division multiplexed optical signal transmitted by the terminal station is improper;
second optical spectrum analyzing means for measuring at least the power level of a signal light for each wavelength of a wavelength-division multiplexed optical signal transmitted by other terminal station; and
transmitting means for transmitting information on the power level of a signal light for each wavelength of a wavelength-division multiplexed optical signal transmitted by the other terminal station to the other terminal station.

16. The terminal station according to claim 15, wherein
said wavelength controlling means controls the wavelength of the signal light in which there is the wavelength deviation, by controlling the temperature of the light source of the signal light based on the value measured by said first optical spectrum analyzing means.

17. The terminal station according to claim 15, wherein
said wavelength controlling means controls the wavelength of the signal light in which there is the wavelength deviation, by controlling the driving current applied to the light source of the signal light based on the value measured by said first optical spectrum analyzing means.

18. The terminal station according to claim 15, wherein
said pre-emphasizing means pre-emphasizes by controlling the gain of an optical amplifier provided to amplify a signal light for each wavelength.

19. The terminal station according to claim 15, wherein
said pre-emphasizing means pre-emphasizes by adjusting the attenuation of a variable optical attenuator for adjusting the output level of a signal light for each wavelength.

20. The terminal station according to claim 15, wherein
said transmitting means stores information on the power level of a signal light for each wavelength of a wavelength-division multiplexed optical signal transmitted from the other terminal station in the overhead of the optical signal, and transmits the signal to the other terminal station.

21. The terminal station according to claim 15, wherein
said transmitting means overlays information on the power level of a signal light for each wavelength of a wavelength-division multiplexed optical signal transmitted from the other terminal station, on an optical signal, and transmits the signal to the other terminal station.

22. The terminal station according to claim 15, wherein
said transmitting means multiplexes information on the power level of a signal light for each wavelength of a wavelength-division multiplexed optical signal transmitted from the other terminal station, to a main optical signal as an optical signal with a wavelength different from the main optical signal, and transmits the signal to the other terminal station.

23. The terminal station according to claim 15, wherein
said first optical spectrum analyzing means and said second optical spectrum analyzing means comprise one optical spectrum analyzer, and the input to the optical spectrum analyzer is switched over by means of an optical switch.

24. A control method of a transmitting terminal station in an optical transmission system for transmitting pre-emphasis information from a receiving terminal station for receiving a plurality of wavelength-multiplexed signal lights from a transmitting station to the transmitting terminal station, comprising the steps of:
detecting the spectrum of signal lights to be transmitted;
detecting spectrum information from the receiving terminal station; and
comparing the spectrum detection result of the signal lights to be transmitted with spectrum information from the receiving terminal station, and controlling the levels and wavelengths of signal lights to be transmitted.

25. A method of controlling the wavelength and power level of each signal light in a wavelength-division multiplexing system for transmitting and receiving wavelength-division multiplexed optical signals between terminal stations, comprising the steps of:

(a) measuring the wavelength deviation of each channel and the power level of a signal light for each wavelength of a wavelength-division multiplexed optical signal transmitted from the terminal station;

(b) measuring at least the power level of a signal light for each wavelength of a wavelength-division multiplexed optical signal transmitted from another terminal station;

(c) adjusting the wavelength of a signal light of a channel when it is judged from the result of (a) that there is a deviation in wavelength of the channel;

(d) transmitting information on the power level of a signal light for each wavelength of a wavelength-division multiplexed optical signal transmitted from the other terminal station; and (e) pre-emphasizing the power level of a signal light for each channel of a wavelength-division multiplexed optical signal transmitted from the terminal station when it is reported to the terminal station from the other terminal station that the power level of a signal light for a wavelength of a wavelength-division multiplexed optical signal transmitted from the terminal station is improper.

26. An apparatus comprising:

a receiving terminal station for use with a transmitting terminal station which includes a transmitting side spectrum information detecting device detecting a spectrum of a wavelength division multiplexed (WDM) signal light including a plurality of signal lights at different wavelengths multiplexed together and transmitted to a transmission path by the transmitting terminal station, a receiving side spectrum information detecting device detecting spectrum information from the receiving terminal station, and a pre-emphasis controlling device comparing spectrum information from the transmitting side spectrum information detecting device with the spectrum information from the receiving side spectrum information detecting device, and controlling power levels and wavelengths of the signal lights before being multiplexed, the receiving terminal station comprising a receiving device receiving the WDM signal from the transmission path, a spectrum analyzing device detecting at least fluctuations in levels of the signal lights from the received WDM signal light, and a transmitting device transmitting spectrum information regarding said at least fluctuations to the transmitting terminal station for comparing by the pre-emphasis controlling device.

27. An apparatus comprising:

a transmitter transmitting a wavelength division multiplexed (WDM) signal light to a transmission path, the WDM signal light including a plurality of signal lights at different wavelengths multiplexed together;

a receiver receiving the WDM signal light from the transmission path; and a controller detecting a spectrum of the WDM signal light from a portion of the WDM signal light decoupled from the WDM signal light after being transmitted to the transmission path and before being received by the receiver, detecting a spectrum of the WDM signal light as received by the receiver, comparing the detected spectrums, and controlling a power level and wavelength of each signal light before being multiplexed together in accordance with the compared spectrums.

28. An apparatus as in claim 27, wherein the controller comprises:

a first spectrum detector detecting said spectrum of the WDM signal light from a portion; and a second spectrum detector detecting said spectrum of the WDM signal light as received by the receiver.

29. An apparatus as in claim 27, further comprising:

a plurality of optical amplifiers amplifying the plurality of signal lights before being multiplexed together, wherein the controller controls gains of the optical amplifiers to control the power levels of the signal lights.

30. An apparatus as in claim 27, further comprising:

a plurality of light sources producing the plurality of signal lights, respectively, before being multiplexed together, wherein the controller controls a temperature of each light source to control the wavelengths of the signal lights.

31. An apparatus as in claim 28, further comprising:

a plurality of light sources producing the plurality of signal lights, respectively, before being multiplexed together, wherein the controller controls a temperature of each light source to control the wavelengths of the signal lights.

32. An apparatus as in claim 27, further comprising:

a plurality of light sources producing the plurality of signal lights, respectively, before being multiplexed together, each light source being driven by a corresponding drive current, wherein the controller controls the drive current of each light source to control the wavelengths of the signal lights.

33. An apparatus as in claim 28, further comprising:

a plurality of light sources producing the plurality of signal lights, respectively, before being multiplexed together, each light source being driven by a corresponding drive current, wherein the controller controls the drive current of each light source to control the wavelengths of the signal lights.

34. An apparatus comprising:

a transmitter transmitting a wavelength division multiplexed (WDM) signal light to a transmission path, the WDM signal light including a plurality of signal lights at different wavelengths multiplexed together;

a receiver receiving the WDM signal light from the transmission path; and means for detecting a spectrum of the WDM signal light from a portion of the WDM signal light decoupled from the WDM signal light after being transmitted to the transmission path and before being received by the receiver, for detecting a spectrum of the WDM signal light as received by the receiver, for comparing the detected spectrums, and for controlling a power level and wavelength of each signal light before being multiplexed in accordance with the compared spectrums.

35. An apparatus comprising:

a plurality of light sources producing a plurality of signal lights, respectively, each signal light being at a different wavelength;

a plurality of level controllers controlling power levels of the plurality of signal lights, respectively;

a multiplexer multiplexing the plurality of power level controlled signal lights together into a wavelength division multiplexed (WDM) signal light, and providing the WDM signal light to an optical fiber transmission line;

a decoupler decoupling a portion of the WDM signal light from the transmission line;

a first spectrum analyzer detecting a spectrum of the WDM signal from the decoupled portion;

a receiver receiving the WDM signal light having the portion decoupled therefrom through the transmission line;

a second spectrum analyzer detecting a spectrum of the WDM signal light from the WDM signal having the portion decoupled therefrom as received by the receiver; and a controller comparing the spectrum detected by the first spectrum analyzer with the spectrum detected by the second spectrum analyzer, controlling the level controllers to control the power levels of the signal lights in accordance with the comparison, and controlling the light sources to control the wavelengths of the signal lights in accordance with the comparison.

36. An apparatus as in claim 35, wherein each of the level controls is an optical amplifier, and the controller controls gains of the optical amplifiers to control the power levels of the signal lights.

37. An apparatus as in claim 35, wherein the controller controls a temperature of each light source to control the wavelengths of the signal lights.

38. An apparatus as in claim 36, wherein the controller controls a temperature of each light source to control the wavelengths of the signal lights.

39. An apparatus as in claim 35, wherein each light source is driven by a corresponding drive current, the controller controlling the drive current of each light source to control the wavelengths of the signal lights.

40. An apparatus as in claim 36, wherein each light source is driven by a corresponding drive current, the controller controlling the drive current of each light source to control the wavelengths of the signal lights.

* * * * *

UNITED STATES PATENT AND TRADEMARK OFFICE
CERTIFICATE OF CORRECTION

PATENT NO.    : 6,185,022 B1                                              Page 1 of 1
DATED         : February 6, 2001
INVENTOR(S)   : Shin-ichirou Harasawa It is certified that error appears in the above-identified patent and that said Letters Patent is hereby corrected as shown below:

<u>Column 14,</u>
Line 4, change "means for" to -- device --.

Signed and Sealed this

Eighth Day of January, 2002

Attest:

JAMES E. ROGAN
Attesting Officer      Director of the United States Patent and Trademark Office